Figure 1:
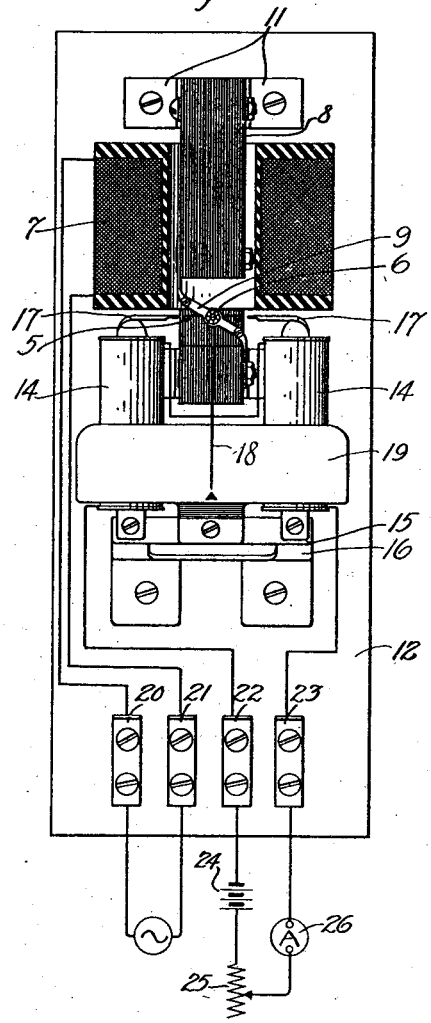

July 2, 1929.  A. M. CURTIS  1,719,465
MEASURING INSTRUMENT
Filed April 23, 1923

Inventor:
Austen M. Curtis,
by C. A. Sprague. Atty.

Patented July 2, 1929.

1,719,465

UNITED STATES PATENT OFFICE.

AUSTEN M. CURTIS, OF EAST ORANGE, NEW JERSEY, ASSIGNOR TO WESTERN ELECTRIC COMPANY, INCORPORATED, OF NEW YORK, N. Y., A CORPORATION OF NEW YORK.

MEASURING INSTRUMENT.

Application filed April 23, 1923. Serial No. 634,054.

This invention relates in general to measuring instruments and more particularly to a vibrating galvanometer for use in making electrical tests with alternating currents of various frequencies.

In the making of alternating current measurements it is a common practice to employ a form of Wheatstone bridge and it is often necessary to make such measurements over a wide frequency range varying from as low as three or four cycles per second up to frequencies above the limit of audibility. For the higher frequencies a standard type of telephone receiver operates satisfactorily as a means for indicating the balance of the testing bridge, but for the lower frequencies the telephone receiver is not sensitive enough and it has been the practice to employ a galvanometer of the vibrating type.

Various forms of galvanometers have been used for this purpose. The type employing a suspended coil is very sensitive but is particularly subject to mechanical vibration. It is possible by changing the length and tension of the suspension of this type, to adjust it so that operation will be satisfactory over a comparatively small frequency range, but for any considerable range in frequency it is necessary to replace the entire moving system with one having different mass and suspension characteristics. Another type of galvanometer used for this work is one having a suspended iron vane with fixed coil and permanent magnet. The period of this type may be altered by changing the length and tension of the suspension and also by changing the strength of the magnet which furnishes part of the elasticity of the moving system. Although less sensitive than the moving coil type, this type operates over a somewhat wider frequency range without the necessity of readjusting or replacing the moving system. In all of the types used heretofore the frequency range is so narrow that it becomes necessary to employ a plurality of moving systems when making a series of tests at widely different frequencies. Moreover, these instruments are very susceptible to mechanical vibrations and are thus entirely unsuitable for use under conditions met with in service use such, for example, as those present when testing cables which are being placed in service.

It is the principal object of the present invention to provide an indicating device which is operable over a wide frequency range without change in the moving system. It is another object of the invention to provide such a device which is portable, sensitive in operation, rugged in construction, and not particularly sensitive to mechanical vibrations. A still further object is to provide such an instrument which is self-protected to the extent that the moving system is not damaged by excessive currents flowing through the energizing coil.

To accomplish these objects and in accordance with a feature of the invention, there is provided a vibrating galvanometer in which the moving system, consisting of a pivoted vane, is without elasticity, the restoring force of the vane being provided by a direct current field so that the frequency range of the instrument is varied by varying the strength of this field. In accordance with another feature of the invention the instrument is made self-protecting by shaping the pole pieces for the restoring field so that the restoring force provided by the field is rapidly decreased as the amplitude of vibration is increased.

Figure 2:
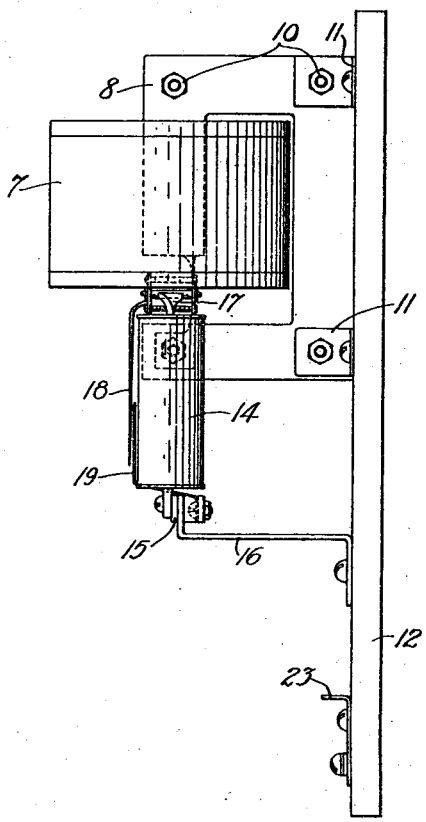

These and other features of the invention may be more clearly understood by reference to the accompanying drawing in which Fig. 1 is a plan view, partly in section showing a galvanometer embodying the features of the invention and Fig. 2 is a side elevation of the galvanometer of Fig. 1.

Referring to the drawing the vane 5 of magnetic material is very light and is pivotally supported in jeweled pivots 6 located at the point of intersection of two magnetic circuits, one an alternating current field produced by the current being measured and the other a direct current field which provides the restoring force. The main flux for this device is produced by the flow of the current under test through the winding of coil 7, the magnetic circuit 8 of which consists of laminations of magnetic material clamped together and so shaped as to insure an air-gap as shown, of sufficient size to accommodate the movable vane 5 with its supporting member 9. The laminations of the magnetic circuit 8 are clamped together by means of the bolts 10 and are supported in a vertical plane by means of the brackets 11—11 which in turn are secured to the insulated base or mounting 12. These laminations are preferably of a nickel-iron alloy so treated that the permeability at low magnetizing forces is higher than that of iron and the coercive force or coercivity lower than that of iron.

The material preferably used for this purpose is prepared by fusing nickel and iron together in the proportion of 78½% nickel and 21½% iron, good commercial grades of these materials being suitable for this purpose. The fused composition is poured into a mould to bring it at once to the proper shape, or it may be brought to the desired shape after moulding by being hammered, swaged, drawn, rolled or worked in any other manner. The composition is then given a heat-treatment to develop therein the highest permeability possible at low magnetizing forces and the lowest possible coercive force. According to present practice, this is done by heating the desired shape to a temperature of about 850° C., maintaining it at that temperature for a few minutes to insure a uniform temperature throughout, then cooling slowly to a temperature of about 600° C. which is just about the critical or transition temperature of the alloy, that is, the temperature at which the magnetic properties disappear on heating and reappear on cooling; and finally cooling from that temperature more rapidly but at a definite rate depending upon the ratio of nickel to iron in the alloy. In a particular instance a convenient method of securing the desired rate of cooling after the material has been maintained for a few minutes at a temperature of 650° C. has been found to be a rapid withdrawing of the material from the furnace and placing it in a blast of air which is controlled to secure a desired rate of cooling. The necessary cooling will always be at a rate intermediate that required for annealing and that at which such strains would be set up in the material as to lower its permeability below the desired value.

The direct current field is produced by current flowing through the coils 14—14 the cores of which are joined at one end by a yoke piece 15 and are secured to the mounting 12 by means of the bracket 16. The pole pieces 17—17 of the coils 14—14 are formed at right angles and their free ends which approach quite closely to the vane 5 are shaped or narrowed down to an edge parallel to the edge of the vane, thus the restoring field is uniform over only a small angular movement of the vane from its normal position. A pointer 18 preferably of aluminum and very light is rigidly secured to the vane 5 and in its movement sweeps over the plate 19 secured to the bracket 16. The winding of the coil 7 is connected to the terminals 20, 21 while the coils 14—14 which are joined in series are connected to terminals 22, 23.

In the operation of the device the source of alternating current to be measured is connected to terminals 20, 21 and a source of direct current, such as a battery 24 is connected in series with a variable resistance 25 and meter 26 to the terminals 22, 23. Since the only restoring force of the vibrating system is that produced by the direct current field, tuning over the entire range may be accomplished by varying the field current by means of the variable resistance 25 and if desired the meter 26 may be calibrated directly in terms of frequency.

Since an instrument of this type is most commonly used as the indicating device for an alternating current bridge operating by what is known as the "null" method, it is obvious that the instrument may be accidentally subjected to an electrical current of a value several hundred times that of the current which it is desired to indicate. By means of the tapered pole pieces the restoring force is rapidly reduced as the amplitude of vibration increases thus detuning the vibrating system and preventing its injury by the heavy current.

It is intended that the scope of the word "iron," as used herein, comprise all varieties of iron which were known on April 23, 1923.

What is claimed is:

1. A measuring instrument comprising an energizing coil having a magnetic circuit including an air gap, a magnetic vane pivotally mounted in said air gap, a restoring coil for producing a magnetic field at said air gap at right angles to the field of said magnetic circuit, means for varying the restoring force of said field, and additional means for automatically reducing the restoring force of said restoring field upon increase in the amplitude of vibration of the vane.

2. A measuring instrument comprising an energizing coil having a magnetic circuit including an air gap, a magnetic vane pivotally mounted in said air gap, a restoring coil having pole pieces each of said pole pieces being narrowed down to an edge as it approaches the vane whereby the restoring force decreases rapidly with increase in amplitude of vibration of the vane, said edges being in alignment with the normal position of said vane, and additional means for varying the restoring force of said restoring coil.

3. A vibrating galvanometer comprising a coil for producing an alternating field having a circuit of magnetic material and an air-gap, another coil for producing a unidirectional field having a circuit of magnetic material and an air-gap, said magnetic fields in said air-gaps intersecting at right angles, a non-elastic moving system comprising a pivoted vane mounted in said air-gaps and substantially closing the air-gap of said other coil and arranged to vibrate in response to said alternating field, means for controlling said uni-directional field in accordance with the frequency of said alternating field.

4. A measuring instrument comprising an air gap, a movable member mounted in said air gap and having an edge, the width of said edge being only a fraction of the width of said air-gap, a coil for producing an alternating operating field in said air gap, another coil for producing an adjustable field in said air gap, said adjustable field being substantially concentrated upon the edge of said movable member, and means for indicating the movement of said member.

5. In a measuring instrument a movable member of magnetic material arranged to revolve about an axis, electromagnetic means for producing an alternating field to operate said member, magnetizing means for said member arranged to render it highly responsive to said alternating field of normal intensities and to render it substantially unresponsive to said alternating field of intensities above said normal intensities, means for controlling the magnetic field of said magnetizing means in accordance with the frequency of said alternating field, and means for indicating the movement of said member.

6. In a measuring device, an air-gap, a pivoted member of magnetic material mounted to move freely in said air-gap and carrying an indicating means, electromagnetic means for producing an alternating field in said air-gap to operate said member, magnetizing means for producing a uni-directional field in said air-gap at an angle to said alternating field to magnetize said member, and means to control said uni-directional field to tune said pivoted member to the frequency of said alternating field.

7. In a vibrating galvanometer, a non-elastic tuned vibratory system comprising a pivoted vane having a mass and electromagnetic means for producing a uni-directional field sharply projected unto said vane for exerting a restoring force upon said mass, another electromagnetic means for producing an alternating field at an angle with said uni-directional field for vibrating said vane, means for adjusting the strength of said restoring force to tune said system into resonance with said alternating field.

8. In a measuring instrument a magnetic member free to revolve about an axis and having an end, a magnetic pole piece having a pole face and placed so that an air gap exists between said face and said end which is shortest in one position of said member, said face being shaped to conform to the shape of said end and the dimensions of said end and of said pole-piece being so small in the direction of movement of said member that the length of said air-gap is increased by displacement of said end from said position substantially in proportion to said displacement.

In witness whereof, I hereunto subscribe my name this 2 day of April, A. D., 1923.

AUSTEN M. CURTIS.